(12) United States Patent
Hall et al.

(10) Patent No.: US 12,005,927 B2
(45) Date of Patent: Jun. 11, 2024

(54) ENABLING CONTENT PLAYING IN AUTONOMOUS VEHICLES OF A TRANSPORTATION SERVICE

(71) Applicant: WAYMO LLC, Mountain View, CA (US)

(72) Inventors: Matthew Corey Hall, Cupertino, CA (US); Maria Moon, Mountain View, CA (US); Orlee Smith, San Francisco, CA (US); Erik Wolsheimer, Mountain View, CA (US); Kyle Bechtel, San Mateo, CA (US)

(73) Assignee: Waymo LLC, Mountain View, CA (US)

( * ) Notice: Subject to any disclaimer, the term of this patent is extended or adjusted under 35 U.S.C. 154(b) by 343 days.

(21) Appl. No.: 17/467,522

(22) Filed: Sep. 7, 2021

(65) Prior Publication Data

US 2022/0176997 A1 Jun. 9, 2022

Related U.S. Application Data

(60) Provisional application No. 63/122,160, filed on Dec. 7, 2020.

(51) Int. Cl.
*B60W 60/00* (2020.01)
*B60W 50/00* (2006.01)
*G06Q 10/02* (2012.01)
*G06Q 50/34* (2012.01)

(52) U.S. Cl.
CPC .... *B60W 60/0013* (2020.02); *B60W 50/0098* (2013.01); *B60W 60/00253* (2020.02); *G06Q 10/02* (2013.01); *G06Q 50/34* (2013.01); *B60W 2050/0088* (2013.01)

(58) Field of Classification Search
CPC ....... B60W 60/0013; B60W 60/00253; B60W 50/0098; B60W 2050/0088; G06Q 10/02
See application file for complete search history.

(56) References Cited

U.S. PATENT DOCUMENTS

| | | | |
|---|---|---|---|
| 11,159,931 B1* | 10/2021 | Mittal | G06F 3/0488 |
| 11,681,788 B2* | 6/2023 | Talha | B60R 25/25 726/2 |
| 2014/0164579 A1* | 6/2014 | Douthitt | G07C 5/008 709/219 |
| 2022/0224963 A1* | 7/2022 | Herz | G06Q 50/30 |

* cited by examiner

*Primary Examiner* — David P. Merlino
*Assistant Examiner* — Shelley Marie Osterhout
(74) *Attorney, Agent, or Firm* — Botos Churchill IP Law

(57) ABSTRACT

Aspects of the disclosure relate to enabling playing of content at an autonomous vehicle. For example, a request to transport a user on a trip may be received. The autonomous vehicle may be assigned to the trip. Whether the user has enabled a content feature may be determined. In response to determining that the user has enabled the content feature a request for a device identifier is sent to the autonomous vehicle. The device identifier generated at the autonomous vehicle is received. The received device identifier may be sent to a content-enabling computing system including one or more processors in order to enable the user to play content from the client computing device at the autonomous vehicle during the trip.

14 Claims, 8 Drawing Sheets

ENABLING CONTENT PLAYING IN AUTONOMOUS VEHICLES OF A TRANSPORTATION SERVICE

CROSS REFERENCE TO RELATED APPLICATIONS

The present application claims the benefit of the filing date of U.S. Provisional Application No. 63/122,160, filed Dec. 7, 2020, the entire disclosure of which is incorporated by reference herein.

BACKGROUND

Autonomous vehicles, for instance, vehicles that do not require a human driver, can be used to aid in the transport of passengers or items from one location to another. Such autonomous vehicles may operate in a fully autonomous mode where passengers may provide some initial input, such as a pickup or destination location, and the autonomous vehicle maneuvers itself to that location. Thus, such autonomous vehicles may be used to provide transportation services, for example, for transporting goods or people.

Various systems enable playing of music and other content via a network by creating connections directly between some computing devices and other devices such as speakers, televisions, etc. For example, systems such as GOOGLE's CAST enable connections between a user's mobile phone and a television, projector, speaker or other device, and APPLE's CARPLAY, enable connections between a user's mobile phone and a vehicle. However, these connections typically require a direct connection between the phone and the device using Bluetooth, near field communication, WiFi or other communication protocols. In addition, these connections may also require direct authentication between the phone and the device using a pairing or other process.

BRIEF SUMMARY

Aspects of the disclosure provide a method for enabling playing of content at an autonomous vehicle. The method includes receiving, by a computing system having one or more processors, from a client computing device, a request to transport a user on a trip; assigning, by the computing system, the autonomous vehicle to the trip; determining, by the computing system, whether the user has enabled a content feature; in response to determining that the user has enabled the content feature sending, by the computing system, a request for a device identifier to the assigned autonomous vehicle; receiving, by the computing system, the device identifier generated at the assigned autonomous vehicle; and sending, by the computing system, the device identifier to a content-enabling computing system including one or more processors in order to enable the user to play content from the client computing device at the assigned autonomous vehicle during the trip.

In one example, the method also includes sending credentials for the user to the content-enabling computing system in order to enable the user to play content from the client computing device at the assigned autonomous vehicle during the trip. In this example, the method also includes, receiving from an application of the client computing device, the credentials prior to receiving the request for the trip. In another example, the method also includes receiving from an application of the client computing device a signal indicating that the user has enabled the content feature and saving the indication with account information of the user in storage. In this example, determining whether the user has enabled a content feature includes accessing the account information in the storage. In another example, the method also includes receiving a signal indicating that the client computing device has been authenticated by one or more computing devices of the autonomous vehicle, and wherein the device identifier is sent in response to receiving the signal. In another example, the method also includes receiving a signal indicating that a door of the autonomous vehicle has been opened, and wherein the device identifier is sent in response to receiving the signal. In another example, the method also includes receiving a first signal indicating that the autonomous vehicle has reached a destination for the trip and in response to receiving the first signal, sending a second signal to the content-enabling computing system requesting that the device identifier be removed from an account of the user, thereby preventing the user from being able to play content at the assigned autonomous vehicle. In another example, the method also includes, after sending the device identifier and during the trip: receiving a new device identifier from the assigned autonomous vehicle and sending, by the computing system, the new device identifier to the content-enabling computing system in order to enable the user to play the content from the client computing device at the assigned autonomous vehicle during the trip. In another example, the playing of content from the client computing device at the assigned autonomous vehicle during the trip is enabled without requiring a direct communication link between the client computing device and the assigned autonomous vehicle.

Another aspect of the disclosure provides a method for enabling playing of content at an autonomous vehicle. The method includes receiving, by a computing system having one or more processors, from a client computing device, a request to transport a user on a trip; assigning, by the computing system, the autonomous vehicle to the trip; determining, by the computing system, whether the user has enabled a content feature; in response to determining that the user has enabled the content feature, identifying, by the computing system, a device identifier for the assigned autonomous vehicle; sending, by the computing system, the device identifier to the client computing device; establishing, by the computing system, a communication link with the assigned autonomous vehicle; and relaying, by the computing system, content received from the client computing device to a computing device of the assigned autonomous vehicle using the communication link.

In one example, the method also includes receiving from an application of the client computing device a signal indicating that the user has enabled the content feature and saving the indication with account information of the user in storage. In this example, determining whether the user has enabled a content feature includes accessing the account information in the storage. In another example, the method also includes receiving a first signal indicating that the autonomous vehicle has reached a destination for the trip and in response to receiving the first signal, removing the device identifier from an account of the user, thereby preventing the user from being able to play content at the assigned autonomous vehicle. In another example, the method also includes, after relaying the content and during the trip: receiving a new device identifier from the assigned autonomous vehicle and sending, by the computing system, the new device identifier to the client computing device in order to enable the user to play the content from the client computing device at the assigned autonomous vehicle during the trip. In another example, the playing of content from the client computing device at the assigned autonomous vehicle during the trip is enabled without requiring a direct communication link between the client computing device and the assigned autonomous vehicle.

DETAILED DESCRIPTION

Overview

Figure 1:
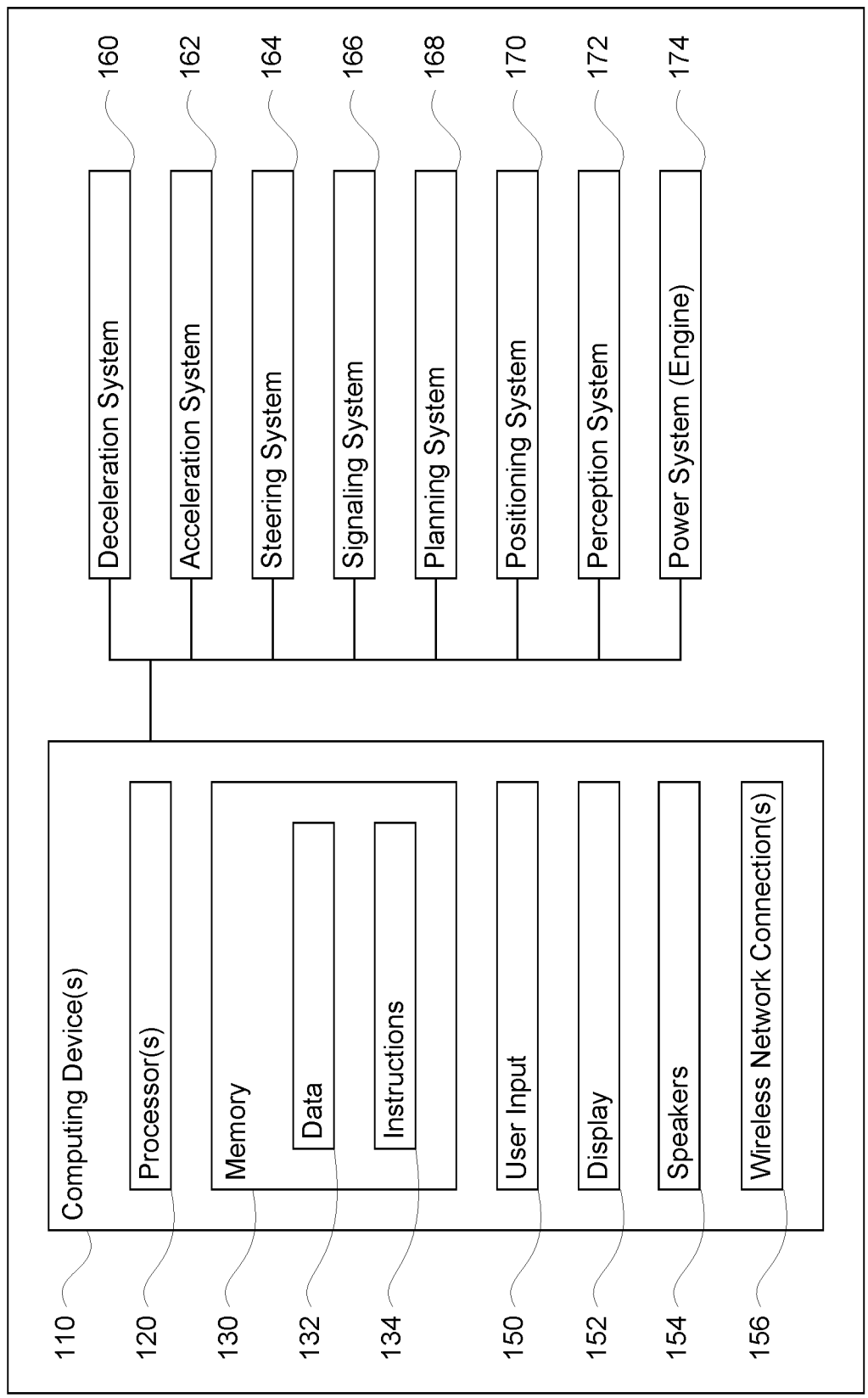
FIG. 1 is a functional diagram of an example autonomous vehicle in accordance with an exemplary embodiment.

The disclosure relates to enabling the playing content for autonomous vehicles of a transportation service. As noted above, various systems enable playing of music and other content via a network by creating connections directly between some computing devices and other devices such as speakers, televisions, etc. Typically, these connections may also require direct authentication between the phone and the device using a pairing or other process. However, for an autonomous vehicle transportation service where a user may be assigned to a new autonomous vehicle each time the user requests a trip, pairing the user's client computing device with each new autonomous vehicle can be both time-consuming and frustrating to the user, and may not even be possible if the autonomous vehicle does not have a WiFi network available for connecting the user's client computing device. Moreover, the client computing device may save the details of the connection which may raise security concerns.

In order to enable the user to play content at or in an autonomous vehicle and request transportation for a trip, a user may download one or more applications to a client computing device. The one or more applications may include a first application for requesting a trip in an autonomous vehicle and a second application for playing content in an autonomous vehicle.

The user may set up a transportation account with the first application by creating credentials which the transportation computing system may use to authenticate the user's client computing device. The first application may provide an option for the user to opt into a content feature to play content in an autonomous vehicle. The user may also set up a content-enabling account with the second application, by creating credentials which the content-enabling computing system may use to authenticate the user's client computing device.

The user may then use his or her client computing device to access the first application and request an autonomous vehicle for a trip to a destination. The user may use client computing device to send a request to the transportation computing system for an autonomous vehicle. In response, the transportation computing system may create a trip identifier for the trip and may assign an autonomous vehicle. The transportation computing system may also send dispatching instructions to the autonomous vehicle for a trip for the user including the pickup location, an intermediate destination, and the final destination.

The transportation computing system may also check to determine whether the content feature has been enabled for the passenger. If a passenger's transportation account indicates that the passenger has opted in to play content, the transportation computing system may send a signal to the computing devices of the assigned autonomous vehicle, requesting a device identifier or device ID for enabling the playing of content at the assigned vehicle.

The computing devices of the assigned autonomous vehicle may receive the request and automatically generate a device ID locally at the assigned autonomous vehicle. Once generated, the computing devices may send the device ID to the transportation computing system. The transportation computing system may receive the device ID and associate it with the passenger's transportation account and the assigned autonomous vehicle. In addition, the transportation computing system may retrieve the passenger's credentials for accessing the content-enabling account.

The transportation computing system may send the device ID, the passenger's credentials for accessing the content-enabling account, as well as information for communicating with the assigned autonomous vehicle to the content-enabling computing system. The content-enabling computing system may receive the device ID, the passenger's credentials for accessing the content-enabling account, as well as information for communicating with the assigned autonomous vehicle. In response, the content-enabling computing system may associate the device ID with the passenger's content-enabling account.

Once the passenger accesses the second application, the second application may communicate with the content-enabling computing system. In response, the content-enabling computing system may provide the list of devices available to the passenger for playing content to the passenger's client computing device. The passenger may then select the device corresponding to the assigned autonomous vehicle. In response, the second application may send a signal to the content-enabling system providing the device ID for the assigned autonomous vehicle.

The content-enabling computing system may receive the device ID, and establish a communication link with the computing device using the information for communicating with the assigned autonomous vehicle associated with the device ID. Thereafter, the passenger may select content to be played at the assigned autonomous vehicle, and the content may be sent from the client computing device to the content-enabling computing system. The content-enabling computing system may receive the content and relay it to the computing devices via the communication link. The computing devices of the autonomous vehicle may then play the received content at the assigned autonomous vehicle. In this regard, there is no direct communication between the client computing device and the computing devices of the assigned autonomous vehicle. Rather, all information is relayed via the content-enabling computing system, and the passenger is able to play content at the assigned autonomous vehicle without having to pair the passenger's client computing device with the vehicle and/or use a local WiFi or other network of the vehicle.

Once the assigned autonomous vehicle has reached the destination location, the computing devices may send a signal to the transportation computing system via the network indicating that the destination has been reached and/or the trip is completed. In response to receiving this signal, the transportation computing system may send a request to the content-enabling computing system to disassociate or remove the device ID of the assigned autonomous vehicle from the passenger's content-enabling account. By doing so, the content-enabling computing system may effectively prevent the passenger from playing content at the assigned autonomous vehicle.

In some instances, the computing devices of the assigned autonomous vehicle may automatically create a new device ID during a trip. In such instances, the computing devices may send the new device ID to the transportation computing system. In response, transportation computing system may send the new device ID, the passenger's credentials for accessing the content-enabling account, as well as information for communicating with the assigned autonomous vehicle to the content-enabling computing system, and the content-enabling computing system may associate the device ID with the passenger's content-enabling account. In this regard, the passenger may again select the assigned autonomous vehicle. In response, the second application may send a signal to the content-enabling computing system providing the new device ID for the assigned autonomous vehicle. Thereafter, a new communication link may be established with the computing devices, and the passenger may again begin playing content at the assigned autonomous vehicle.

Although the examples above describe the transportation computing devices and content-enabling server computing devices as remote or distinct from one another, these devices may actually be the same physical device and/or may be managed by the same operators (e.g. all managed by operators of the transportation service rather than two separate entities). This implementation may work similarly to the example where there are distinct devices, but with some differences.

The features described herein may enable content playing in autonomous vehicles. A user may be able to seamlessly connect their client computing device (e.g. mobile phone) to an autonomous vehicle without having to spend time utilizing a pairing process each time the user is assigned to a new autonomous vehicle. In addition, because the device IDs are created by the autonomous vehicle and managed at the content-enabling computing system and/or transportation computing system, the process appears seamless to the user, and the user is prevented from being able to play content in an autonomous vehicle once a user's trip with that autonomous vehicle is over. Moreover, if the autonomous vehicle creates a new device ID during a trip, this is automatically updated at the content-enabling computing system and/or transportation computing system to create a new communication with the user's client computing device without the user having to troubleshoot a connection with the autonomous vehicle.

Example Systems

As shown in FIG. 1, an autonomous vehicle 100 in accordance with one aspect of the disclosure includes various components. While certain aspects of the disclosure are particularly useful in connection with specific types of vehicles, the autonomous vehicle may be any type of vehicle including, but not limited to, cars, trucks, motorcycles, buses, recreational vehicles, etc. The autonomous vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, electronic display 152 may be located within a cabin of the autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the autonomous vehicle 100 and may be capable of communicating with various components of the autonomous vehicle in order to control the autonomous vehicle in an autonomous driving mode. For example, returning to FIG. 1, the computing devices 110 may be in communication with various systems of the autonomous vehicle 100, such as deceleration system 160, acceleration system 162, steering system 164, routing system 166, planning system 168, positioning system 170, and perception system 172 in order to control the movement, speed, etc. of the autonomous vehicle 100 in accordance with the instructions 134 of memory 130 in the autonomous driving mode.

As an example, the computing devices 110 may interact with deceleration system 160 and acceleration system 162 in order to control the speed of the autonomous vehicle. Similarly, steering system 164 may be used by computing devices 110 in order to control the direction of the autonomous vehicle 100. For example, if the autonomous vehicle 100 is configured for use on a road, such as a car or truck, the steering system may include components to control the angle of wheels to turn the autonomous vehicle. The computing devices 110 may also use the signaling system in order to signal the autonomous vehicle's intent to other drivers or vehicles, for example, by lighting turn signals or brake lights when needed.

Routing system 166 may be used by the computing devices 110 in order to generate a route to a destination. Planning system 168 may be used by computing device 110 in order to follow the route. In this regard, the planning system 168 and/or routing system 166 may store detailed map information, e.g., highly detailed maps identifying a road network including the shape and elevation of roadways, lane lines, intersections, crosswalks, speed limits, traffic signals, buildings, signs, real time traffic information, pull-over spots, vegetation, or other such objects and information.

The routing system 166 may use the map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the autonomous vehicle, etc. Each route may include a list of a plurality of nodes and edges which the autonomous vehicle can use to reach the destination. Routes may be recomputed periodically as the autonomous vehicle travels to the destination.

Positioning system 170 may be used by computing devices 110 in order to determine the autonomous vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the autonomous vehicle. The location of the autonomous vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 170 may also include other devices in communication with the computing devices 110, such as an accelerometer, gyroscope or another direction/speed detection device to determine the direction and speed of the autonomous vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 2:
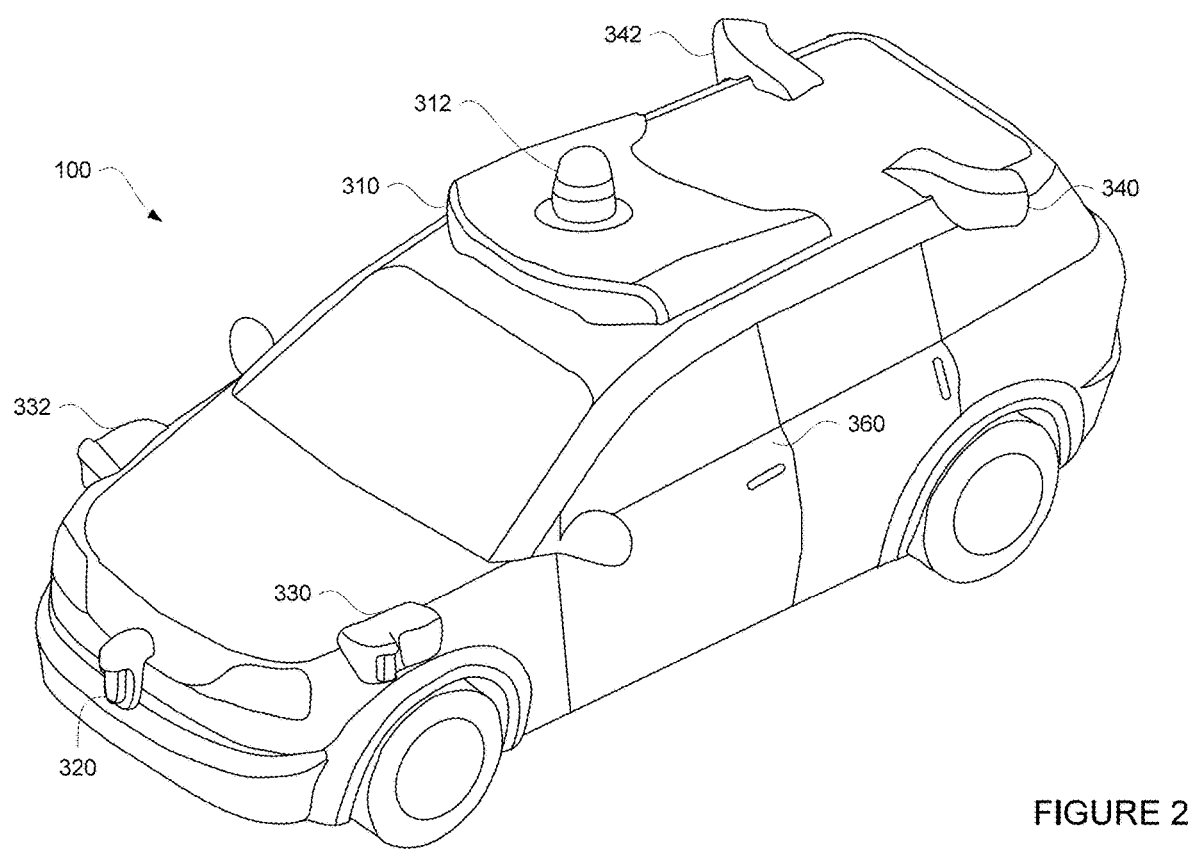
FIG. 2 is an example external view of an autonomous vehicle in accordance with aspects of the disclosure.

The perception system 172 also includes one or more components for detecting objects external to the autonomous vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the autonomous vehicle is a passenger vehicle such as a minivan, the minivan may include a laser or other sensors mounted on the roof or other convenient location. For instance, FIG. 2 is an example of an external view of the autonomous vehicle 100. In this example, roof-top housing 310 and dome housing 312 may include a LIDAR sensor as well as various cameras and radar units. In addition, housing 320 located at the front end of the autonomous vehicle 100 and housings 330, 332 on the driver's and passenger's sides of the autonomous vehicle may each store a LIDAR sensor. For example, housing 330 is located in front of driver door 360. Autonomous vehicle 100 also includes housings 340, 342 for radar units and/or cameras also located on the roof of the autonomous vehicle 100. Additional radar units and cameras (not shown) may be located at the front and rear ends of the autonomous vehicle 100 and/or on other positions along the roof or roof-top housing 310.

The computing devices 110 may be capable of communicating with various components of the autonomous vehicle in order to control the movement of the autonomous vehicle 100 according to primary vehicle control code of memory of the computing devices 110. For example, returning to FIG. 1, the computing devices 110 may include various computing devices in communication with various systems of the autonomous vehicle 100, such as deceleration system 160, acceleration system 162, steering system 164, routing system 166, planning system 168, positioning system 170, perception system 172, and power system 174 (i.e. the autonomous vehicle's engine or motor) in order to control the movement, speed, etc. of the autonomous vehicle 100 in accordance with the instructions 134 of memory 130.

The various systems of the autonomous vehicle may function using autonomous vehicle control software in order to determine how to and to control the autonomous vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the autonomous vehicle as well as an emergency vehicle detection system software module configured to detect emergency vehicles from sensor data generated by sensors of the autonomous vehicle. Each of these detection system software modules may use various models to output a likelihood of a construction zone or an object being an emergency vehicle. Detected objects, predicted future behaviors, various likelihoods from detection system software modules, the map information identifying the autonomous vehicle's environment, position information from the positioning system 170 identifying the location and orientation of the autonomous vehicle, a destination location or node for the autonomous vehicle as well as feedback from various other systems of the autonomous vehicle may be input into a planning system software module of the planning system 168. The planning system 168 may use this input to generate trajectories for the autonomous vehicle to follow for some brief period of time into the future based on a route generated by a routing module of the routing system 166. In this regard, the trajectories may define the specific characteristics of acceleration, deceleration, speed, etc. to allow the autonomous vehicle to follow the route towards reaching a destination. A control system software module of the computing devices 110 may be configured to control movement of the autonomous vehicle, for instance by controlling braking, acceleration and steering of the autonomous vehicle, in order to follow a trajectory.

The computing devices 110 may control the autonomous vehicle in an autonomous driving mode by controlling various components. For instance, by way of example, the computing devices 110 may navigate the autonomous vehicle to a destination location completely autonomously using data from the detailed map information and planning system 168. The computing devices 110 may use the positioning system 170 to determine the autonomous vehicle's location and perception system 172 to detect and respond to objects when needed to reach the location safely. Again, in order to do so, computing device 110 and/or planning system 168 may generate trajectories and cause the autonomous vehicle to follow these trajectories, for instance, by causing the autonomous vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of the autonomous vehicle 100 by steering system 164), and signal such changes (e.g., by lighting turn signals). Thus, the acceleration system 162 and deceleration system 160 may be a part of a drivetrain that includes various components between an engine of the autonomous vehicle and the wheels of the autonomous vehicle. Again, by controlling these systems, computing devices 110 may also control the drivetrain of the autonomous vehicle in order to maneuver the autonomous vehicle autonomously.

Figure 3:
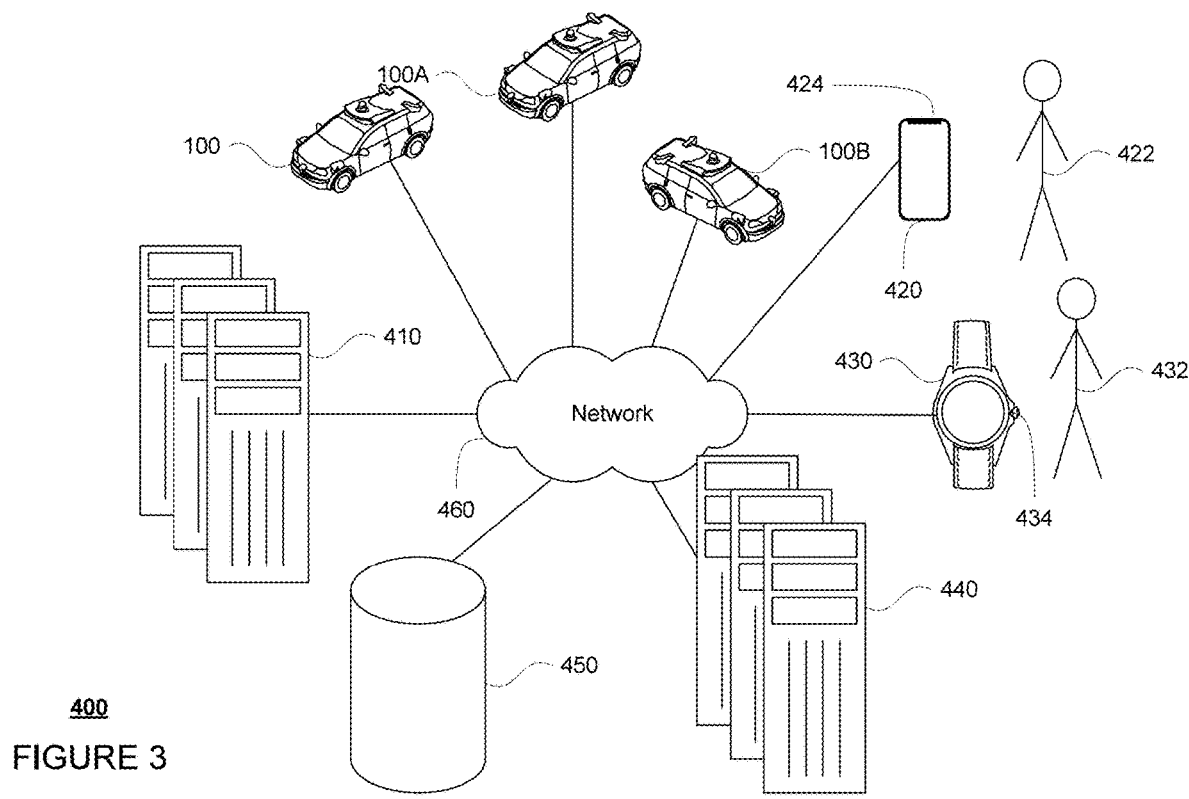
FIG. 3 is a pictorial diagram of an example system in accordance with aspects of the disclosure.
Figure 4:
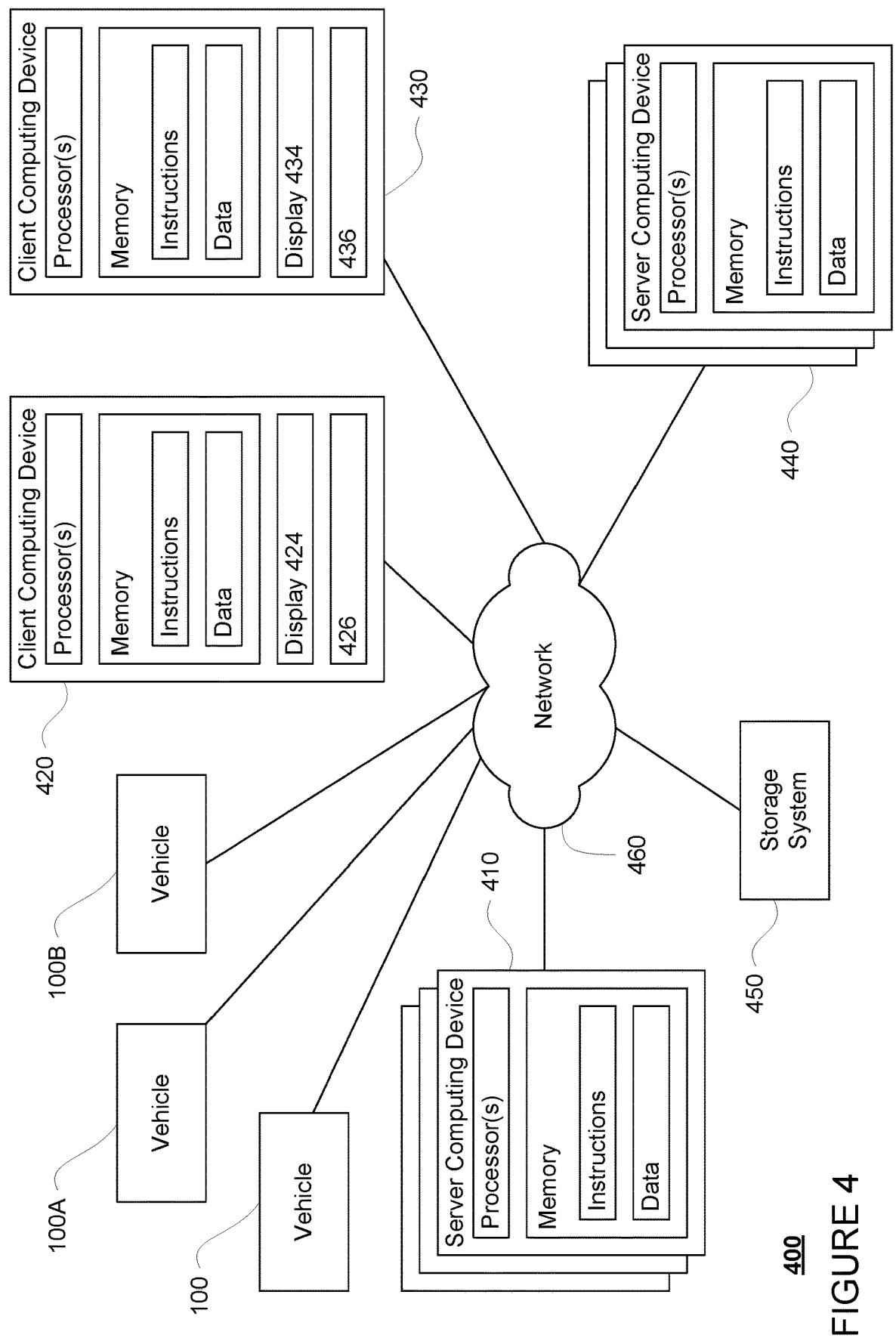
FIG. 4 is a functional diagram of the system of FIG. 3 in accordance with aspects of the disclosure.

Computing device 110 of the autonomous vehicle 100 may also receive or transfer information to and from other computing devices, such as those computing devices that are a part of the transportation service as well as other computing devices. FIGS. 3 and 4 are pictorial and functional diagrams, respectively, of an example system 400 that includes a plurality of computing devices 410, 420, 430, 440 and a storage system 450 connected via a network 460. System 400 also includes the autonomous vehicle 100A and the autonomous vehicle 100B, which may be configured the same as or similarly to the autonomous vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of the autonomous vehicle 100 or a similar computing device of the autonomous vehicle 100A or the autonomous vehicle 100B as well as computing devices 420, 430, 440 via the network 460. For example, autonomous vehicles 100, 100A, 100B, may be a part of a fleet of vehicles that can be dispatched by server computing devices to various locations. In this regard, the server computing devices 410 (hereafter transportation computing system 410) may function as a transportation computing system which can be used to dispatch vehicles such as autonomous vehicles 100, 100A, 100B to different locations in order to pick up and drop off passengers as well as to generate and track scouting quests and objectives as discussed further below. In addition, the transportation computing system 410 may use network 460 to transmit and present information to a user, such as user 422, 432 on a display, such as displays 424, 434 of computing devices 420, 430. In this regard, computing devices 420, 430 may be considered client computing devices.

The transportation computing system 410 may be configured to select vehicles for ride or transport services depending upon locations of the autonomous vehicles, passengers and/or goods (e.g. cargo), destinations, etc. This information, including the locations of the autonomous vehicles, status of passengers and/or goods, destinations, etc. may be tracked, for instance, in a status table of the storage system 450. In this regard, all or part of the storage system 450 may be remote from or part of transportation computing system 410. The transportation computing system 410 may also track the state of the autonomous vehicles using information that is periodically broadcast by the autonomous vehicles, specifically requested by the transportation computing system 410 and provided by the autonomous vehicles, or using other methods of tracking the states of a fleet of autonomous vehicles. This periodically broadcast information may include messages providing all state information for a given vehicle. For instance state messages may be self-consistent and generated based on rules about packaging the messages from various systems of the autonomous vehicles. As an example, the messages may include vehicle pose, lane information (i.e., in what lane the autonomous vehicle is currently traveling), as well as other information, such as whether the autonomous vehicle is currently providing transportation services, experiencing any errors or problems, etc.

Other computing systems, such as the server computing devices 440, may also be configured to communicate with the transportation computing system 410. The server computing devices 440 may function as a content-enabling computing system (hereafter content-enabling computing system 440) which enables content from a client computing device to be played at the vehicle. The content-enabling computing system, for example, may be managed and/or operated by a third party and/or the transportation service. The content-enabling computing system may send and receive information with the transportation computing system 410 as well as the autonomous vehicle 100 (and autonomous vehicles 100A, 100B) via the network 460 as discussed further below. The content-enabling computing system 440 may track device IDs and facilitate connections between client computing devices and autonomous vehicles in order to enable the playing of content from the client computing devices at the autonomous vehicles. Device ID information may be tracked, for instance, in a status table, database, or other storage method of the storage system 450 and/or another storage system.

As shown in FIG. 4, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434 (e.g., a monitor having a screen, a touch-screen, a projector, a television, or other device that is operable to display information), and user input devices 426, 436 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. In some examples, client computing devices 420, 430 may be used by passengers of an autonomous vehicle. In other words, users 422, 432 may represent users or passengers of the transportation service. As an example the user may input information using a small keyboard, a keypad, microphone, using visual signals with a camera, or a touch screen. Although only a few users are shown in FIGS. 3 and 4, any number of such users may be included in a typical system.

As with memory 130, storage system 450 can be of any type of computerized storage capable of storing information accessible by the transportation computing system 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of the computing devices 110, 410, 420, 430, 440, etc.

Storage system 450 may store various types of information as described in more detail below including device identifiers, account information etc. This information may be retrieved or otherwise accessed by a server computing device, such as one or more server computing devices of the transportation computing system 410 and/or the content-enabling computing system 440, in order to perform some or all of the features described herein.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 7:
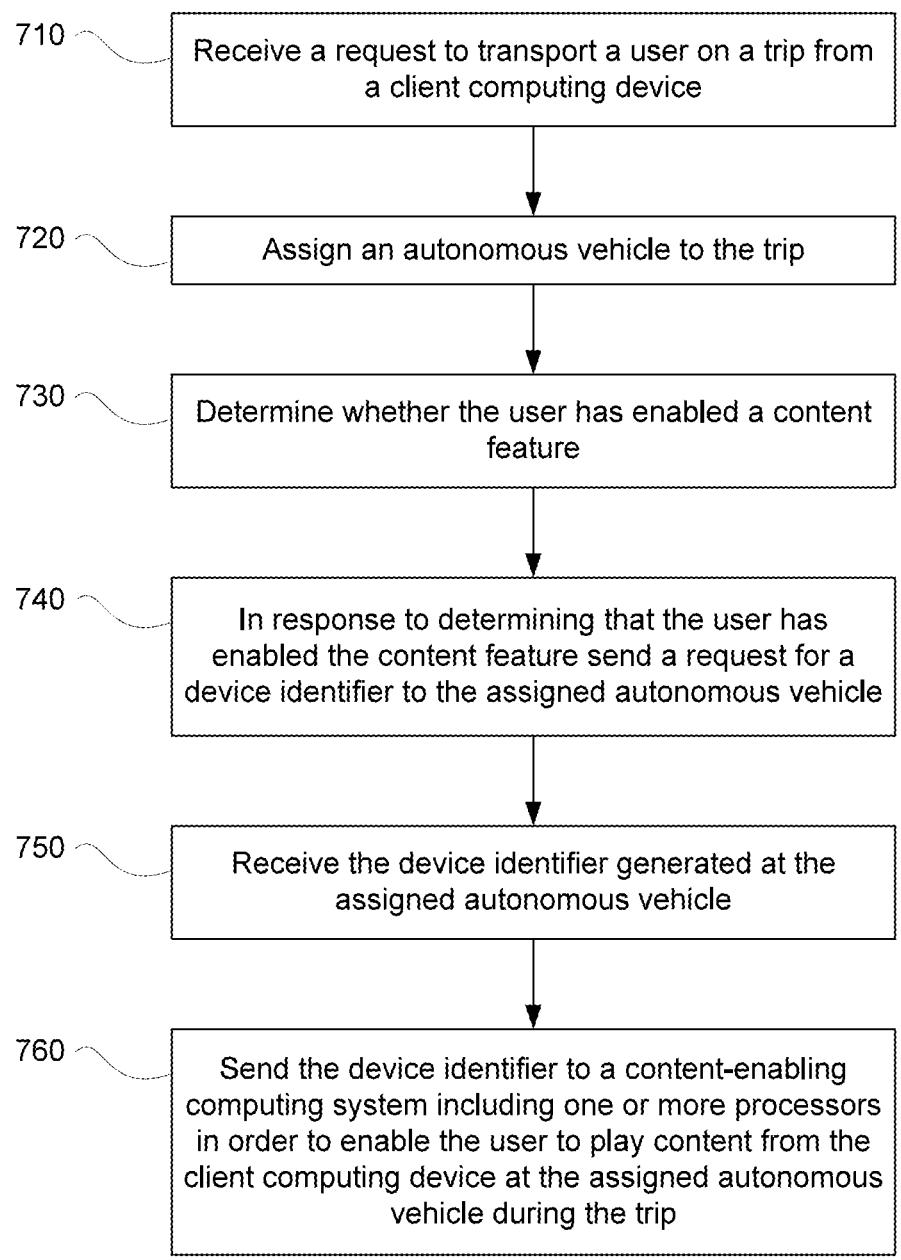
FIG. 7 is an example flow diagram in accordance with aspects of the disclosure.

FIG. 7 is an example flow diagram 700 for enabling playing of content at an autonomous vehicle which may be performed by processors of a computing system, such as the transportation computing system 410. Turning to block 710, a request to transport a user on a trip is received from a client computing device. In order to enable the user to play content at an autonomous vehicle and request transportation for a trip, a user may download one or more applications to a client computing device. The one or more applications may include a first application for requesting a trip in an autonomous vehicle and a second application for playing content in an autonomous vehicle. Although the examples described herein relate to utilizing distinct applications, the first and second applications may be a single application that both enables arranging trips and playing content. To download the one or more applications, users 422 and 432 may download the one or more applications via a link in an email, directly from a website, or an application store to client computing devices 420 and 430. For example, client computing device 420 may transmit a request for the application over the network, for example, to the transportation computing system 410 and/or the content-enabling computing system 440, and in response, receive the one or more applications. The one or more applications may be installed locally at the client computing device.

The user may set up a transportation account with the first application by creating credentials which the transportation computing system may use to authenticate the user's client computing device and/or the user. For example, the user may enter a user name, such as an email address and password, which the application may send to the transportation computing system. The transportation computing system may create an account for the user and save this information, for example, in the storage system 450.

Figure 5:
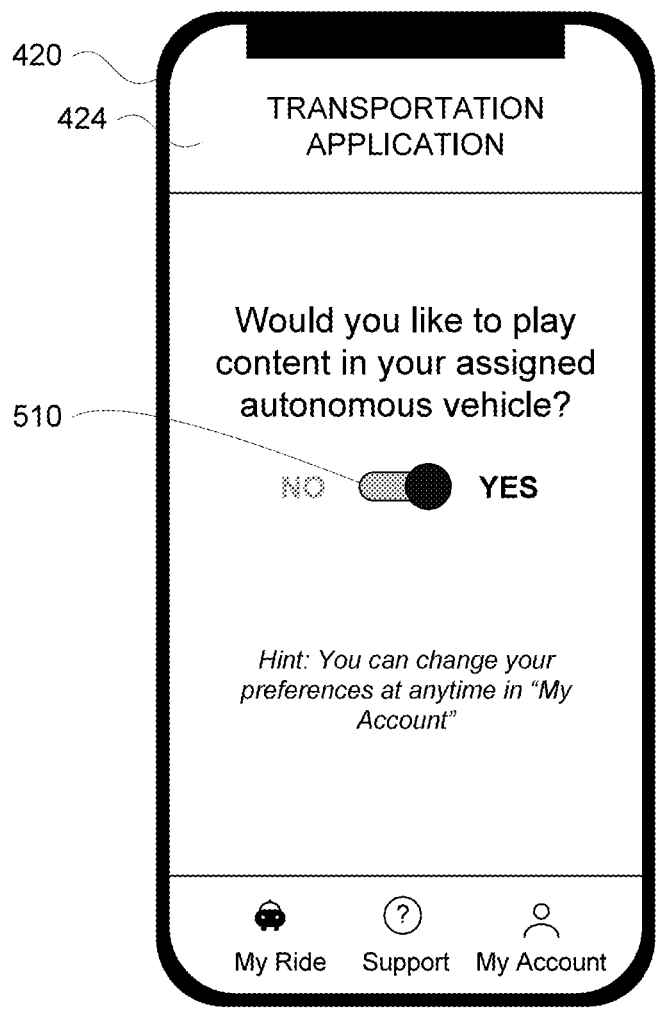
FIG. 5 is an example of a client computing device and option on a display in accordance with aspects of the disclosure.

The first application may provide an option for the user to opt into a content feature to play content in an autonomous vehicle. For example, FIG. 5 depicts an example of an option 510 displayed on display 424 of client computing device 420. In this example, the option is depicted as a toggle switch, which can be toggled back and forth by tapping on the display 424 at the location of the option 510, but other modes of selection, such as radio buttons, etc. may also be used. Selecting this option 510 may cause the application to send a notification to the transportation computing system indicating whether or not the user has opted in to playing content in an autonomous vehicle. The transportation computing system may save an indication of whether or not the user has opted into playing content in an autonomous vehicle with the user's transportation account in the storage system 450.

The user may also set up a content-enabling account with the second application, by creating credentials which the content-enabling computing system may use to authenticate the user's client computing device and/or the user. For example, the user may enter a user name, such as an email address and password, which the application may send to the transportation computing system in order to create an account. The transportation computing system may create an account for the user and save this information, for example, in the storage system 450.

For ease of use, the user may be required to use the same credentials to access both services, e.g. both the transportation account and content-enabling account may use the same credentials. In this regard, the user may only need to create a single account for both computing systems. Alternatively, when selecting to opt into the content feature, the user may be required to provide the credentials used to access the content-enabling account. For example, the user may enter the credentials into the application which may send the credentials to the transportation computing system. The transportation computing system may access the account for the user and save this information, for example, in the storage system 450. In some instances, the transportation computing system may send the credentials to the content-enabling computing system 440 in order to confirm that the credentials are correct. If not, the transportation computing system may send a notification to the client computing device indicating that the credentials are not correct.

The user may then use his or her client computing device to access the first application and request an autonomous vehicle for a trip to a destination. As an example, a user such as user 422 may use client computing device 420 to send a request to the transportation computing system 410 for an autonomous vehicle. This may involve sending the credentials for the user's transportation account to the transportation computing system 410 (though these may be stored locally at the client computing device 420 for faster access) for authentication purposes. In addition, the user may identify a pickup location, an intermediate destination and/or intermediate drop off location, and a destination and/or a drop off location. In this regard, the drop off location may be a physically different location from a destination location.

A user or passenger may specify a pick up, intermediate destination, and final destination locations in various ways. As an example, a pickup location can be defaulted to the current location of the passenger's client computing device, but may also be a recent or saved location near the current location associated with the passenger's account. The passenger may enter an address or other location information, tap a location on a map or select a location from a list in order to identify a pickup and/or destination location. For instance, the client computing device 420 may send its current location, such as a GPS location, to the transportation computing system 410 via network 460 and/or a destination name or address for any intermediate and the final destination. In response, the transportation computing system 410 may provide one or more suggested locations or may identify the current location as a pickup location and locations corresponding to the destination name or address as an intermediate or final destination for the autonomous vehicle.

Returning to FIG. 7, at block 720, the autonomous vehicle is assigned to the trip. Once the user 422 (now passenger 422) has selected or confirmed the pickup and destination locations, the transportation computing system 410 may create a trip identifier or trip ID for the passenger 422's trip. In addition, the transportation computing system 410 may assign an autonomous vehicle, such as autonomous vehicle 100, to the passenger 422 and the trip ID. This may involve associating a vehicle ID for the assigned autonomous vehicle 100 with the trip ID and the passenger 422's account. All of this information and associations may be tracked by the transportation computing system and stored in the storage system 450.

The transportation computing system may also send dispatching instructions to the autonomous vehicle for a trip for the user including the pickup location, an intermediate destination, and the final destination. This may cause the autonomous vehicle to control itself in the autonomous driving mode towards the pickup location, for instance by using the various systems of the autonomous vehicle as described above, in order to complete the trip.

The transportation computing system may also send information to enable the computing devices 110 to authenticate the passenger's client computing device, such as credentials for the trip, a unique token, etc. The transportation computing system may also send the user's client computing device information to enable the passenger's client computing device to authenticate itself to the computing devices. In this regard, once the passenger and the vehicle are close to the pickup location, e.g. within 50 meters or more or less, the client computing device via the first application and the computing devices 110 will attempt to complete the authentication for example via BLUETOOTH or other communication protocols. Once the authentication is completed, the computing devices 110 may unlock one or more of the doors (such as door 360) in order to allow the passenger to open the door and enter the vehicle.

At block 730, whether the user has enabled a content feature is determined. The transportation computing system 410 may also check to determine whether the content feature has been enabled for the passenger 422. In addition to the above, the transportation computing system 410 may also access the storage system 450 in order to determine whether the passenger 422's transportation account indicates that the passenger has opted in to play content at an assigned autonomous vehicle. If not, the transportation computing system 410 will take no further action in that regard.

At block 740, in response to determining that the user has enabled the content feature, a request for a device identifier is sent to the assigned autonomous vehicle. If passenger 422's account indicates that the passenger has opted in to play content, the transportation computing system 410 may send a signal to the computing devices 110 of the assigned autonomous vehicle 100, for instance, via the network 460, requesting a device identifier or device ID for enabling the playing of content at the assigned vehicle.

The computing devices 110 of the assigned autonomous vehicle 100 may receive the request and automatically generate a device ID locally at the assigned autonomous vehicle 100. In this regard, the memory 130 may store instructions for generating a new device ID. These instructions may be standard instructions for generating a device ID which are provided by operators of the content-enabling computing system. The computing devices 110 may also store the device ID locally.

Once generated, the computing devices 110 may send the device ID to the transportation computing system 410. In addition, the computing device 110 may establish a communication link with the content-enabling computing system 440, for example using a standard communications protocol such as Transmission Control Protocol/Internet Protocol (TCP/IP). The computing devices 110 may also provide the device ID to the content-enabling computing system 440. In some instances, the content-enabling computing system 440 may determine whether the device ID is associated with any user's content-enabling accounts. If not, the content-enabling computing system 440 may continue the communication link, but may not send any content to the computing devices 110.

The device ID may be a globally unique value. For example, the device ID could be a combination of a vehicle ID (or something specific to the vehicle such as a vehicle identification number (YIN), license plate number, etc.) and the date and current time. This information may, for example, be used to seed a random number generator to create the device ID. In addition, once the device ID is created, it can be sent to the content-enabling computing system 440 by the vehicle and/or the transportation computing system 410 in order to confirm that the device ID is unique and not already in use. If already in use, the content-enabling computing system 440 and/or the server computing devices 440 could notify the vehicle and/or the server computing devices 440 that the device ID is invalid so that the vehicle can generate a new device ID, for example, using a now updated current date and time as a seed in the random number generator.

At block 750, a device identifier generated at the autonomous vehicle is received. The transportation computing system 410 may receive the device ID and associate it with the passenger 422's transportation account and the assigned autonomous vehicle 100. In this regard, the device ID may also be associated with the trip ID for the trip as well as the vehicle ID for the assigned autonomous vehicle 100. Again, this information and associations may be tracked and stored in the storage system 450. In addition, the transportation computing system 410 may retrieve the passenger 422's credentials for accessing the content-enabling account (which may be the same as those used to access the transportation account).

At block 760, the device identifier is sent to a content-enabling computing system including one or more processors in order to enable the user to play content from the client computing device at the assigned autonomous vehicle during the trip. The transportation computing system 410 may send the device ID and the passenger 422's credentials for accessing the content-enabling account to the content-enabling computing system 440. In order to avoid a passenger playing content at a vehicle before the passenger has actually entered the vehicle, the transportation computing system 410 may wait to send the device ID to the content-enabling computing system until the transportation computing system 410 has received a signal that the passenger has entered the vehicle. Once a client computing device has been authenticated, the computing devices 110 may automatically send a signal indicating the same to the transportation computing system 410. Similarly, once an unlocked door of the vehicle 100 has been opened, the computing devices 110 may automatically send a signal indicating the same to the transportation computing system 410. Once one or both of these signals are received, the transportation computing system 410 may send the device ID and the passenger's credentials to the content-enabling computing system 440. In this regard, the device ID may be generated as soon as a vehicle is assigned to the passenger, but may not be sent to the content-enabling computing system until the passenger's client computing device has been authenticated by the vehicle and a door of the vehicle has been unlocked and/or opened.

The content-enabling computing system 440 may receive the device ID, the passenger 422's credentials for accessing the content-enabling account. In response, the content-enabling computing system 440 may associate the device ID with the passenger 422's content-enabling account. This may involve adding the device ID to the list of devices available to the passenger 422 for playing content.

Figure 6:
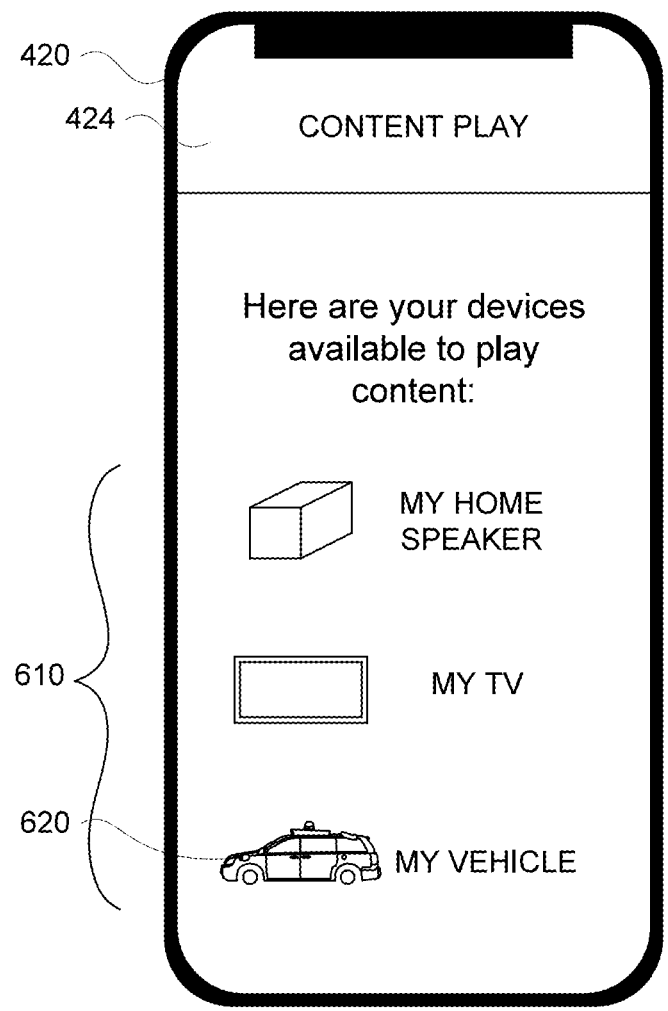
FIG. 6 is an example of a client computing device and list of devices on a display in accordance with aspects of the disclosure.

Once the passenger 422 accesses the second application or music and/or video-playing application, the second application or the music and/or video-playing application may communicate with the content-enabling computing system 440. This may include sending the passenger's credentials for the user 422's content-enabling account (which may be stored locally at the client computing device 420). In response, the content-enabling computing system 440 may provide the list of devices available to the passenger 422 for playing content to the passenger 422's client computing device. As shown in FIG. 6, the second application or the music and/or video-playing application may display a list 610 of devices available for the passenger to play content. In this example, the list 610 includes an entry for a device 620 corresponding to the assigned autonomous vehicle 100 ("My Ride"). In this regard, the passenger 422 may be able to see the assigned autonomous vehicle 100 as being an available device for playing content. The passenger 422 may then select the device corresponding to the assigned autonomous vehicle 100, for example, by tapping on the display 424 at the location of the device 620. In response, the second application or the music and/or video-playing application may send a signal to the content-enabling computing system 440 providing the device ID for the assigned autonomous vehicle 100.

If successful, the passenger 422 may select content to be played at the assigned autonomous vehicle 100. For instance, the passenger 422 may use the music and/or video-playing application at the client computing device 420 and access content, such as music and/or videos, stored locally at the client computing device and/or streamed from a third-party streaming service. For example, the passenger 422 could play content such as music, audio books, podcasts, live radio streams, movies, television shows, live streams of videos, etc. As an example, the passenger 422 may accomplish this by tapping options displayed on the display 424 or by using voice prompts. The music and/or video-playing application may communicate with the second application and/or directly with the content-enabling computing system in order to provide the passenger 422 with an option to play content. In this regard, the music and/or video playing application may already include some integration with the second application and/or the services provided by the content-enabling computing system 440. In response, the second application and/or the music and/or video-playing application may begin to send the content to the content-enabling computing system 440 via the network 460. The content-enabling computing system 440 may receive the content and relay it to the computing devices 110 via the communication link. The computing devices 110 may then play the received content using the speakers 154 and/or other devices of the assigned autonomous vehicle 100. In this regard, there is no direct communication between the client computing device 420 and the computing devices 110. Rather, all information is relayed via the content-enabling computing system, and the passenger 422 is able to play content at the assigned autonomous vehicle 100 without having to pair the passenger 422's client computing device 420 with the vehicle and/or use a local WiFi or other network of the vehicle.

In addition, the computing devices 110 may cache the received content locally in the memory 130 in order to allow the passenger 422 to control play of the content by providing options for the user to pause, play, skip a song, etc. using inputs for display 152 and/or the user inputs 150 for the duration of the trip. In addition or alternatively, the passenger 422 may use the second application to pause, play, skip a song, etc. by tapping options displayed on the display 424 or by using voice prompts. In this regard, the second application may send corresponding signals to the content-enabling computing system 440 which may relay such signals to the computing devices 110 via the communication link.

Once the assigned autonomous vehicle 100 has reached the destination location, the computing devices 110 may send a signal to the transportation computing system 410 via the network 460 indicating that the destination has been reached and/or the trip is completed. In response to receiving this signal, the transportation computing system 410 may send a request to the content-enabling computing system 440 to disassociate or remove the device ID of the assigned autonomous vehicle 100 from the passenger 422's content-enabling account. By doing so, the content-enabling computing system 440 may effectively prevent the passenger 422 from playing content at the assigned autonomous vehicle 100. In addition, once the signal has been sent, computing devices 110 may automatically delete the locally stored device ID and/or replace it with a new one for another trip.

In some instances, the computing devices 110 may automatically create a new device ID during a trip. This may occur if there is an error with the communication link and/or if the computing devices 110 are reset, or if the passenger changes vehicle (e.g. if the vehicle breaks down or if a new vehicle is sent when the passenger is waiting at an intermediate destination). In such instances, the computing devices 110 may also store the new device ID, replacing the local version of the prior device ID. Once generated, the computing devices 110 may send the new device ID to the transportation computing system 410. In response, transportation computing system 410 may receive the new device ID and associate it with the passenger 422's transportation account and the assigned autonomous vehicle 100. Again, the transportation computing system 410 may send the new device ID, the passenger 422's credentials for accessing the content-enabling account, as well as information for communicating with the assigned autonomous vehicle 100 to the content-enabling computing system, and the content-enabling computing system 440 may associate the device ID with the passenger 422's content-enabling account. In this regard, the passenger 422 may access the second application or the music and/or video playing application and see the assigned autonomous vehicle 100 as being available to play content as discussed above with regard to the example of FIG. 6. In some instances, a notification letting the passenger know that the communication link has been restored and is available again may be displayed in the vehicle and/or the passenger client computing device.

The passenger 422 may then select the device corresponding to the assigned autonomous vehicle 100, for example, by tapping on the display 424 at the location of the device 620. In this regard, the passenger 422 may be able to see the assigned autonomous vehicle 100 as again being an available device for playing content, albeit with the new device ID. The passenger 422 may then select the assigned autonomous vehicle 100. In response, the second application or the music and/or video playing application may send a signal to the content-enabling computing system 440 providing the new device ID for the assigned autonomous vehicle 100. Thereafter, a new communication link may be established with the computing devices 110, and the passenger 422 may again begin playing content at the assigned autonomous vehicle 100.

Figure 8:
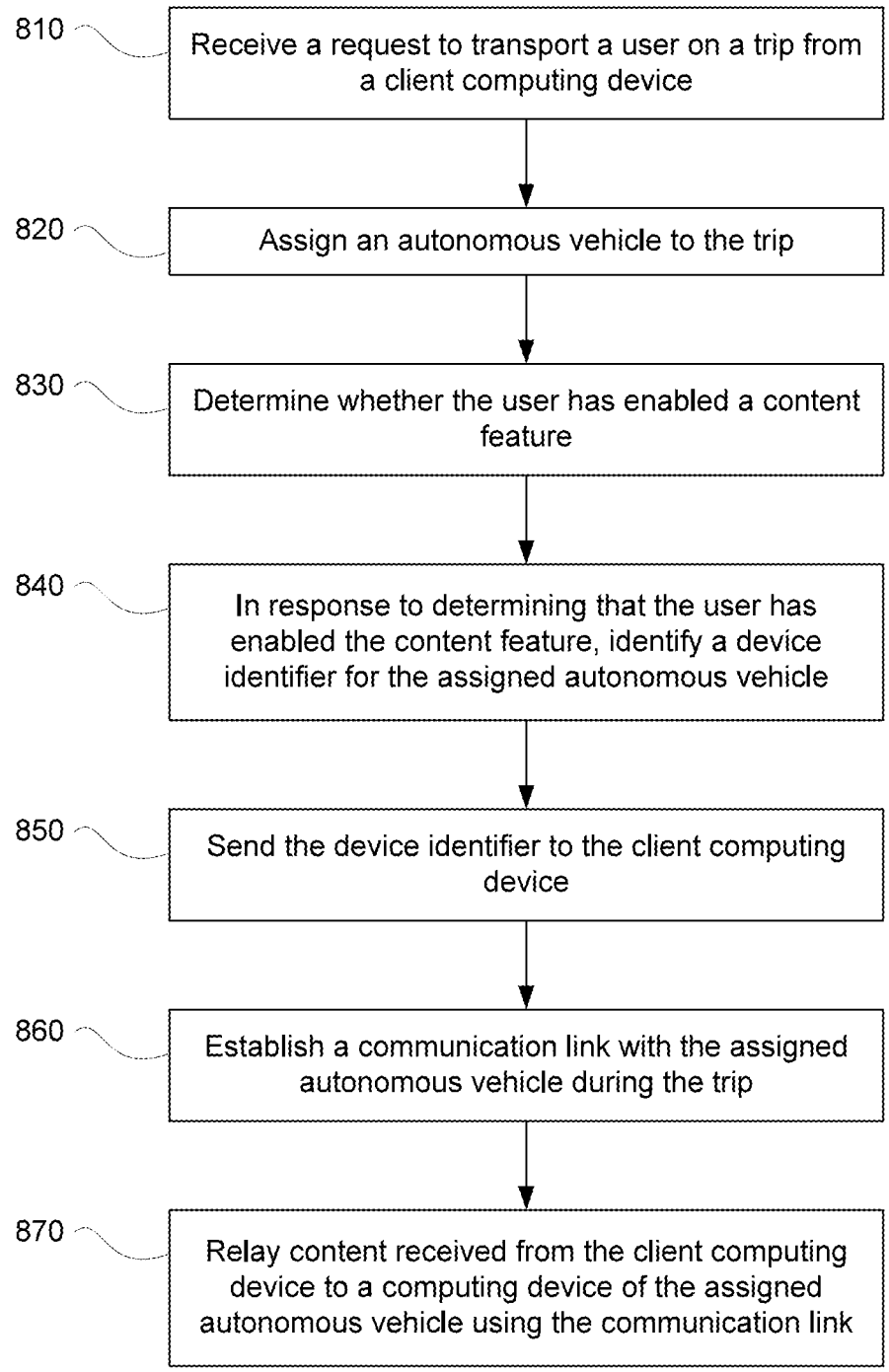
FIG. 8 is an example flow diagram in accordance with aspects of the disclosure.

Although the examples above describe the transportation computing devices and content-enabling server computing devices as remote or distinct from one another, these devices may actually be the same physical device and/or may be managed by the same operators (e.g. all managed by operators of the transportation service rather than two separate entities). FIG. 8 is an example flow diagram 800 for enabling playing of content at an autonomous vehicle which may be performed by processors of a computing system, such as the transportation computing system 410. Turning to block 810, a request to transport a user on a trip is received from a client computing device, and at block 820, the autonomous vehicle is assigned to the trip. At block 830, whether the user has enabled a content feature is determined. At block 840, in response to determining that the user has enabled the content feature, a device identifier may be identified. For example, a request for a device ID may be sent to the autonomous vehicle, and a device ID may be generated at the assigned autonomous vehicle then sent to and received by the transportation computing system. In this regard, each of the operations of block 810-830 and 840 may be achieved as described in the examples above with respect to block 710-730 and 740-750 of FIG. 7, respectively. Alternatively, the device ID may be generated by the transportation computing system or may simply be the vehicle ID or another predetermined identifier for the assigned autonomous vehicle that the transportation computing system 410 has access to, for example, in the storage system 450.

At block 850 the device identifier is sent to the client computing device. In this regard, the transportation computing system 410 would identify and/or receive a device ID generated by the assigned autonomous vehicle 100 and rather than forwarding this device ID to the content-enabling computing system 440 (which would no longer be required), the transportation computing system 410 may send the device ID to the passenger 422's client computing device 420 and may also associate this device ID with the passenger 422's transportation account. In this regard, the passenger 422 may access the first application (as the second application may not be necessary), the second application, or a music and/or video playing application and see the assigned autonomous vehicle 100 as being available to play content as discussed above with regard to the example of FIG. 6 (although in this implementation, the list 610 may include only device 620 and may not actually include other devices). The passenger 422 may then select the assigned autonomous vehicle 100. In response, the first application, the second application, or the music and/or video playing application may send content to the transportation computing system 410 to be played at the vehicle. In this regard, the second application and/or the music and/or video playing application may already include some integration with the first application, the second application and/or the services provided by the transportation computing system 410.

In order to avoid a passenger playing content at a vehicle before the passenger has actually entered the vehicle, the transportation computing system 410 may wait to send the device ID to the client computing device until the transportation computing system 410 has received a signal that the passenger has entered the vehicle. Once a client computing device has been authenticated, the computing devices 110 may automatically send a signal indicating the same to the transportation computing system 410. Similarly, once an unlocked door of the vehicle 100 has been opened, the computing devices 110 may automatically send a signal indicating the same to the transportation computing system 410. Once one or both of these signals are received, the transportation computing system 410 may send the device ID to the passenger's client computing device. In this regard, the passenger is not able to play content at the vehicle until the passenger's client computing device has been authenticated by the vehicle and a door of the vehicle has been unlocked and/or opened.

At block 860, a communication link is established with the assigned autonomous vehicle during the trip. In response to the signal, the transportation computing system 410 may establish a communication link, for example using a standard communications protocol such as Transmission Control Protocol/Internet Protocol (TCP/IP), with the assigned autonomous vehicle 100 in order to play content. This link may be established at any point in time before, during or after the trip.

At block 870, content received from the client computing device is relayed to a computing device of the assigned autonomous vehicle using the communication link. As noted above, the passenger 422 may use the music and/or video playing application at the client computing device 420 and access content, such as music and/or video, stored locally at the client computing device and/or streamed from a third-party streaming service. As an example, the passenger 422 may accomplish this by tapping options displayed on the display 424 or by using voice prompts. In response, the first application, second application, or the music and/or video playing application may begin to send the content to the transportation computing system 410 via the network 460. The transportation computing system 410 may receive the content and relay it to the computing devices 110 via the communication link. The computing devices 110 may then play the received content using the speakers 154 and/or other devices of the assigned autonomous vehicle 100. In this regard, there is no "direct" communication between the client computing device 420 and the computing devices 110. Rather, all information is relayed via the transportation computing system 410, and the passenger 422 is able to play content at the assigned autonomous vehicle 100 without having to pair the passenger 422's client computing device with the vehicle and/or use a local WiFi or other network of the vehicle.

In addition, the computing devices 110 may cache the received content locally in the memory 130 in order to allow the passenger 422 to control play of the content by providing options for the user to pause, play, skip a song, etc. using inputs for display 152 and/or the user inputs 150 for the duration of the trip. In addition or alternatively, the passenger 422 may use the second application to pause, play, skip a song, etc. by tapping options displayed on the display 424 or by using voice prompts. In this regard, the first application (or the second application) may send corresponding signals to the transportation computing system 410 which may relay such signals to the computing devices 110 via the communication link.

Once the assigned autonomous vehicle 100 has reached the destination location, the computing devices 110 may send a signal to the transportation computing system 410 via the network 460 indicating that the destination has been reached and/or the trip is completed. In response to receiving this signal, the transportation computing system 410 may disassociate or remove the device ID of the assigned autonomous vehicle 100 from the passenger 422's transportation account. By doing so, the transportation computing system 410 may effectively prevent the passenger 422 from playing content at the assigned autonomous vehicle 100. In addition, once the signal has been sent, computing devices 110 may automatically delete the locally stored device ID and/or replace it with a new one for another trip.

As with the instances described, the computing devices 110 may automatically create a new device ID during a trip. In such instances, the computing devices 110 may also store the new device ID, replacing the local version of the prior device ID. Once generated, the computing devices 110 may send the new device ID to the transportation computing system 410. In response, transportation computing system 410 may receive the new device ID and associate it with the passenger 422's transportation account and the assigned autonomous vehicle 100. In this regard, the passenger 422 may access the first application (as the second application may not be necessary) or the second application and see the assigned autonomous vehicle 100 as being available to play content as discussed above with regard to the example of FIG. 6. The passenger 422 may then select the device corresponding to the assigned autonomous vehicle 100, for example, by tapping on the display 424 at the location of the device 620 (again, in this implementation, the list 610 may include only device 620 and may not actually include other devices). In response, the first application (or the second application) may send a signal to the transportation computing system 410 providing the new device ID for the assigned autonomous vehicle 100. Thereafter, a new communication link may be established with the computing devices 110, and the passenger 422 may again begin playing content at the assigned autonomous vehicle.

In order to better enable the playing of content at an assigned autonomous vehicle 100, the first time a user requests a trip and the content feature is enabled, the first application may provide a notification to the user to remind the user that the content feature is available and/or to download the second application (if applicable). On subsequent trips, this notification need not be provided. As another example, if the user's client computing device already has the second application installed (if applicable), the notification need not be provided or may simply remind the user that the content feature is available.

The features described herein may enable content playing in autonomous vehicles. A user may be able to seamlessly connect their client computing device (e.g. mobile phone) to an autonomous vehicle without having to spend time utilizing a pairing process each time the user is assigned to a new autonomous vehicle. In addition, because the device IDs are created by the autonomous vehicle and managed at the content-enabling computing system and/or transportation computing system, the process appears seamless to the user, and the user is prevented from being able to play content in an autonomous vehicle once a user's trip with that autonomous vehicle is over. Moreover, if the autonomous vehicle creates a new device ID during a trip, this is automatically updated at the content-enabling computing system and/or transportation computing system to create a new communication link with the user's client computing device without the user having to troubleshoot a connection with the autonomous vehicle.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for enabling playing of content at an autonomous vehicle, the method comprising:
    receiving, by a computing system having one or more processors, from a client computing device, a request to transport a user on a trip;
    assigning, by the computing system, the autonomous vehicle to the trip;
    determining, by the computing system, whether the user has enabled a content feature;
    in response to determining that the user has enabled the content feature sending, by the computing system, a request for a device identifier to the assigned autonomous vehicle;
    receiving, by the computing system, the device identifier generated at the assigned autonomous vehicle; and
    sending, by the computing system, the device identifier to a content-enabling computing system including one or more processors in order to enable the user to play content from the client computing device at the assigned autonomous vehicle during the trip.

2. The method of claim 1, further comprising, sending credentials for the user to the content-enabling computing system in order to enable the user to play content from the client computing device at the assigned autonomous vehicle during the trip.

3. The method of claim 2, further comprising, receiving from an application of the client computing device, the credentials prior to receiving the request for the trip.

4. The method of claim 1, further comprising:
    receiving from an application of the client computing device a signal indicating that the user has enabled the content feature; and
    saving the indication with account information of the user in storage, and wherein determining whether the user has enabled a content feature includes accessing the account information in the storage.

5. The method of claim 1, further comprising receiving a signal indicating that the client computing device has been authenticated by one or more computing devices of the autonomous vehicle, and wherein the device identifier is sent in response to receiving the signal.

6. The method of claim 1, further comprising receiving a signal indicating that a door of the autonomous vehicle has been opened, and wherein the device identifier is sent in response to receiving the signal.

7. The method of claim 1, further comprising:
    receiving a first signal indicating that the autonomous vehicle has reached a destination for the trip; and
    in response to receiving the first signal, sending a second signal to the content-enabling computing system requesting that the device identifier be removed from an account of the user, thereby preventing the user from being able to play content at the assigned autonomous vehicle.

8. The method of claim 1, further comprising, after sending the device identifier and during the trip:
    receiving a new device identifier from the assigned autonomous vehicle; and
    sending, by the computing system, the new device identifier to the content-enabling computing system in order to enable the user to play the content from the client computing device at the assigned autonomous vehicle during the trip.

9. The method of claim 1, wherein the playing of content from the client computing device at the assigned autonomous vehicle during the trip is enabled without requiring a direct communication link between the client computing device and the assigned autonomous vehicle.

10. A method for enabling playing of content at an autonomous vehicle, the method comprising:
    receiving, by a computing system having one or more processors, from a client computing device, a request to transport a user on a trip;
    assigning, by the computing system, the autonomous vehicle to the trip;
    determining, by the computing system, whether the user has enabled a content feature;
    in response to determining that the user has enabled the content feature, identifying, by the computing system, a device identifier for the assigned autonomous vehicle;
    sending, by the computing system, the device identifier to the client computing device;
    establishing, by the computing system, a communication link with the assigned autonomous vehicle; and
    relaying, by the computing system, content received from the client computing device to a computing device of the assigned autonomous vehicle using the communication link.

11. The method of claim 10, further comprising:
    receiving from an application of the client computing device a signal indicating that the user has enabled the content feature; and
    saving the indication with account information of the user in storage, and wherein determining whether the user has enabled a content feature includes accessing the account information in the storage.

12. The method of claim 10, further comprising:
receiving a first signal indicating that the autonomous vehicle has reached a destination for the trip; and
in response to receiving the first signal, removing the device identifier from an account of the user, thereby preventing the user from being able to play content at the assigned autonomous vehicle.

13. The method of claim 10, further comprising, after relaying the content and during the trip:
receiving a new device identifier from the assigned autonomous vehicle; and
sending, by the computing system, the new device identifier to the client computing device in order to enable the user to play the content from the client computing device at the assigned autonomous vehicle during the trip.

14. The method of claim 10, wherein the playing of content from the client computing device at the assigned autonomous vehicle during the trip is enabled without requiring a direct communication link between the client computing device and the assigned autonomous vehicle.

\* \* \* \* \*